April 18, 1950     L. G. TUBBS     2,504,909
REGULATOR
Filed March 9, 1949
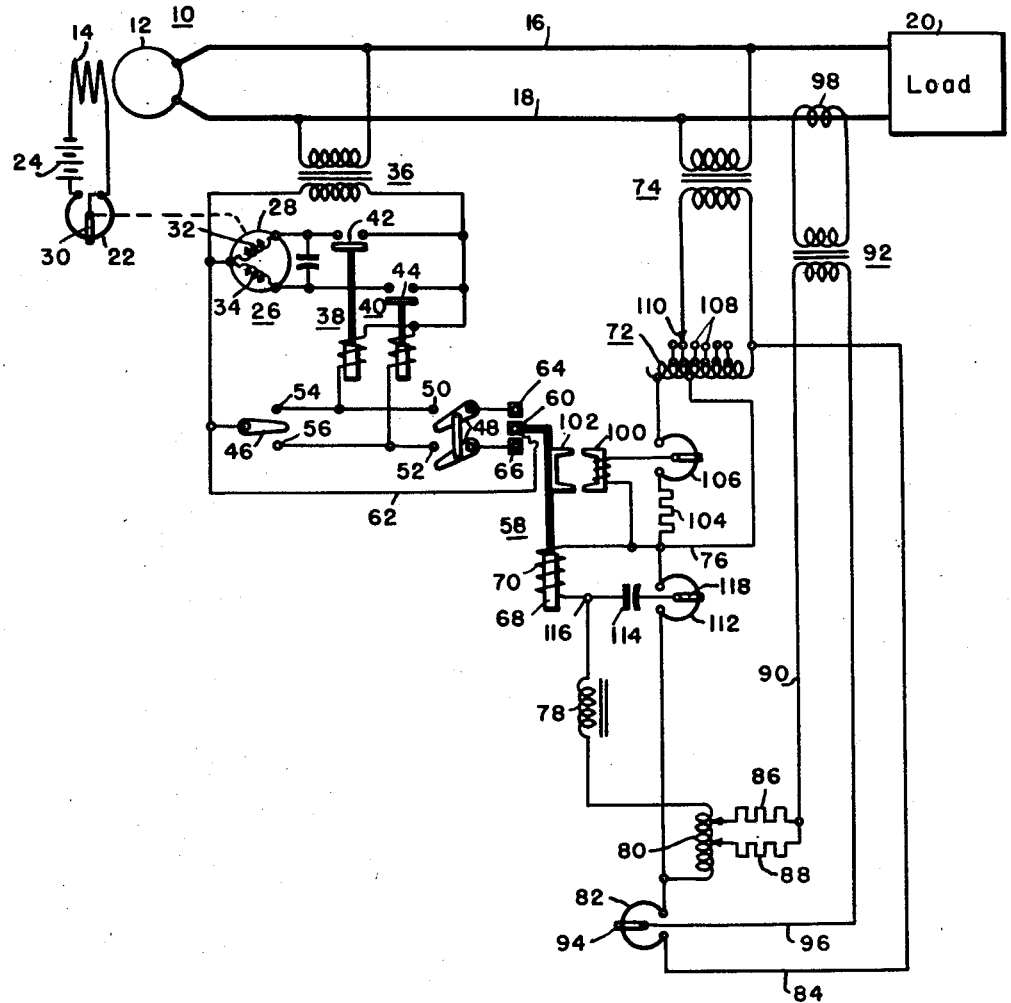
WITNESSES:
INVENTOR
Lester G. Tubbs.
BY
ATTORNEY Patented Apr. 18, 1950

2,504,909

UNITED STATES PATENT OFFICE 2,504,909

REGULATOR

Lester G. Tubbs, Pittsburgh, Pa., assignor to Westinghouse Electric Corporation, East Pittsburgh, Pa., a corporation of Pennsylvania Application March 9, 1949, Serial No. 80,382

5 Claims. (Cl. 323—74)

This invention relates to regulators and particularly to the control of the primary or voltage relay or contact making device that is sensitive to the regulated quantity and controls the operation of the regulator.

In regulating systems which utilize a voltage or primary relay or other contact making device which is responsive to a change in a quantity to be regulated to effect a regulating operation, it is desired to provide a voltage level adjustment of the relay. This has previously been done by changing the tension of a spring or the position of a balance weight usually and commonly associated with the relay. Such methods of adjustment are however objectionable because the operator must handle a sensitive relay and the adjustments made may cause the relay to become inoperative.

An object of this invention is to provide, in a regulator utilizing a primary relay, for remotely adjusting the energization of the relay.

Another object of this invention is to provide, in a regulating system utilizing a primary relay to control the operation of a regulator, a control circuit disposed to be selectively adjusted for adjusting the energization of the relay within a predetermined band of energization for different regulated operating conditions.

Other objects of this invention will become apparent from the following description when taken in conjunction with the accompanying drawing, the single figure of which is a diagrammatic representation of apparatus and circuits illustrating an embodiment of this invention.

Referring to the drawing, this invention is illustrated as applied to the regulation of a dynamo-electric machine 10 having an armature winding 12 and a field winding 14, the machine being connected by conductors 16 and 18 to supply a load 20. The excitation of the field winding 14 is controlled by adjusting the setting of a variable rheostat 22 which is connected in series circuit with a battery 24 and the field winding 14.

In the embodiment illustrated, the rheostat 22 may be adjusted by operation of a motor 26, the armature 28 of which is mechanically connected to operate the movable contact member 30 of the rheostat 22 to either shunt or connect more sections of the rheostat in the field winding circuit, depending upon the direction of rotation of the motor 26. The direction of rotation of the motor 26 depends upon which of windings 32 and 34 are energized from a suitable source which, in this instance, is illustrated as the transformer 36 connected across conductors 16 and 18 and depends upon the selective energization of a pair of contactors 38 and 40, the contact members 42 and 44, respectively, of which are disposed to be actuated to establish the energizing circuit for windings 32 and 34, respectively.

In order to control the selective energization of the contactors 38 and 40, a pair of manually operable switches 46 and 48 are provided. The switch 48 is a double pole switch which when in the circuit closed position to engage contact members 50 and 52 will permit an automatic selection, as will be described hereinafter, of the energization of contactors 38 and 40. The switch 46 is a single pole switch disposed for manual operation into engagement with contact members 54 or 56 to selectively energize contactor 38 or 40, respectively, to control the direction of operation of the motor 26 to effectively lower or raise the excitation of the generator 10. When it is desired to have the regulator responsive to automatic operation dependent upon the variation of the voltage across conductors 16 and 18 from a predetermined value, the manual operative switch 46 is positioned in the neutral position as shown, midway between contact members 54 and 56, and the double pole switch 48 is moved to its circuit establishing position with contact members 50 and 52.

A primary or voltage relay 58 is provided having a contact member 60 connected by conductor 62 to one end of the transformer 36 and disposed for operation to selectively engage stationary contact member 64 or 66 to establish a circuit through the switch 48, contact member 50 or 52, respectively, and the energizing winding of contactor 38 or 40, respectively, to the other end of the transformer 36 to selectively effect the actuation of contactor 38 or 40 to move the contact member 42 or 44, respectively, into circuit closing position to selectively energize winding 32 or 34 of the motor 26. The relay 58 comprises a movable armature member 68 and a winding 70 disposed about the core of the armature member and connected through a tapped transformer 72 and a potential transformer 74 across the conductors 16 and 18 to be energized in accordance with a measure of the voltage thereacross.

In the embodiment illustrated, one end of the winding 70 is connected through conductor 76 to a tap of the transformer 74, illustrated as an auto transformer, the other end of the winding 70 being connected through a temperature compensating reactor 78, a reactance compensator 80 and a resistance compensator 82 and conductor 84 to a terminal of the transformer 72. The reactor 78 is preferably used for temperature compensation as described in my Patent No. 2,165,080. The reactor 80 is connected through a pair of taps and resistors 86 and 88 and conductor 90 to one end of a transformer 92, the movable contact member 94 of the resistor 82 being connected through conductor 96 to the other end of the transformer 92, the primary winding of which is energized from the current transformer 98 which is inductively associated with conductor 18. The series connected reactor 80 and resistor 82 are thus connected to introduce reactance and resistance compensation in circuit with the winding 70 of the primary relay 58 as is well known in the art.

In order to tend to stabilize the operation of the relay 58 to maintain it in the neutral position shown for a given energization, an electromagnet 100 is associated with a U-shaped member 102 which is capable of being magnetically attracted and is carried by the movable arm of the primary relay 58. The winding of the electromagnet 100 is connected across a fixed resistor 104 and an adjustable resistor 106 which are connected across a section of the transformer 72. Such stabilizing members and their operation are described and claimed in my Patent No. 2,414,570 issued January 21, 1947.

As illustrated the transformer 72 is provided with a plurality of taps 108 so arranged that as the movable contact member 110 is adjusted from tap to tap a predetermined band or increment of voltage change is made, each band preferably being the same, for example, 5% voltage change. In order to make intermediate adjustments of the energization of the winding 70 within the range of such predetermined bands, and at a point remote from the primary relay 58, a potentiometer resistor 112 is connected in parallel circuit relation with the series connected energizing winding 70 and the temperature compensating reactor 78, and a capacitor 114 is connected between a fixed tap 116 intermediate of the series connected winding 70 and reactor 78 and the movable contact member 118 of the potentiometer resistor 112. Thus, by adjusting the sliding contact member 118 of the potentiometer resistor 112, the capacitor 114 can be selectively connected in parallel with the energizing winding 70 of the primary relay 58 or in parallel with the reactor 78 to in effect give a remote adjustment of the energization of the winding 70 within the band of voltage adjustment obtained by changing the connections of contact member 110 from one of the taps 108 of the transformer 72 to an adjacent tap.

In operation, with the switch 48 in circuit closed position for automatic response of the regulator in accordance with changes of the electrical quantity to be regulated, and with the contact member 110 engaging a predetermined tap 108 of the transformer 72, the energizing winding 70 of the primary relay 58 is energized in accordance with a measure of the voltage across the conductors 16 and 18. In normal operation, if the voltage across conductors 16 and 18 is of the predetermined value which is to be maintained, the measure of the voltage impressed on the winding 70 should be sufficient to maintain the movable contact member 60 of the primary relay 58 in the neutral position shown and if the voltage across conductors 16 and 18 should vary from the predetermined value which is to be maintained, the relay 58 is energized to actuate the contact member 60 into engagement with either stationary contact member 64 or 66, depending upon the direction of change in the voltage across the conductors 16 and 18. Thus, if the voltage across conductors 16 and 18 should increase so that the movable contact member 60 is actuated into engagement with the stationary contact member 64, the energizing winding of contactor 38 is so energized as to actuate the contact member 42 into circuit closed position to effect the energization of the field winding 32 of the motor 26 to effect an operation thereof to decrease the excitation of the field winding 14 of the generator 10 and consequently decrease the voltage across conductors 16 and 18.

On the other hand, if the change in the voltage across the conductors 16 and 18 should be a decrease from the predetermined value which is to be maintained, then the movable contact member 60 engages the stationary contact member 66 to effectively energize the winding of contactor 40 to actuate the contact member 44 thereof into circuit closing position to effectively energize the winding 34 of the motor 26 and effect an operation thereof to increase the excitation of the field winding 14 of generator 10 and thereby increase the voltage across conductors 16 and 18.

If the adjustment of the contact member 110 into engagement with one of the taps 108 is insufficient to impress a voltage on the winding 70 of the primary relay 58 to maintain the movable contact member 60 thereof in the neutral position for a given voltage across conductors 16 and 18 that is to be maintained, then the energization of the winding 70 can be adjusted an intermediate amount equivalent to the band of voltage occasioned by a change of the contact member 110 from one of the taps 108 to an adjacent tap, by selectively connecting the capacitor 114 in parallel with either the winding 70 or the reactor 78.

Thus, for example, if the initial setting of the contact member 110 on one of the given taps 108 in effect creates an operation of the relay 58 to maintain a voltage across conductors 16 and 18 slightly higher than that which it is desired to maintain, the sliding contact member 118 of the potentiometer resistor 112 is moved in a counterclockwise direction, as shown in the drawing, to in effect, connect the capacitor 114 in parallel with the energizing winding 70 of the primary relay 58. With the capacitor 114 in parallel with the operating winding 70, the capacitor draws a leading current with respect to the voltage across the winding 70 and because of the vector difference of the currents in the winding 70 and the capacitor 114, the current in the reactor 78 is decreased with the result that there is less of a drop in the series circuit formed of the winding 70 and reactor 78 and a slightly larger voltage is impressed across the winding 70 to actuate the movable contact member 60 into engagement with the stationary contact member 64 to effect the energization of the winding 32 of the motor 26 to effectively decrease the excitation of the field winding 14, and thereby effect a slight decrease in the voltage across the conductors 16 and 18 to a value which is to be maintained.

On the other hand, if it is desired to increase the voltage a slight amount to obtain the voltage which is to be maintained, then the sliding contact member 118 of the potentiometer resistor 112 is moved in a clockwise direction as shown in the drawing to connect the capacitor 114 in parallel with the reactor 78 under which circumstances the current flowing through the series reactor 78 will be increased with the result that there is a larger potential drop in the series circuit formed of the winding 70 and the reactor 78, whereby the energization of the winding 70 is decreased somewhat and the movable contact member 60 engages the stationary contact member 66 to effect the energization of the winding 34 of the motor 26 and the motor 26 operates to increase the excitation of the field winding 14 whereby the voltage across conductors 16 and 18 is increased to the value which is to be maintained.

With the remote adjustment of the energization of the primary relay 58 as described hereinbefore, it is apparent that if the adjustment should fail as by reason of the contact member 118 becoming disengaged from the resistor 112, that the adjustment fails "safe." This is evident for the remote adjustment effects at the most only about a 5% voltage change and since such 5% voltage change is divided on one side or the other of one of the taps 108, it is apparent that when such adjustment fails, the voltage across the winding 70 goes to the mid-value of the 5% range whereby the energization of the winding 70 would only vary at a maximum only 2½% from any voltage established by the contact member 110 engaging any one of the taps 108. Such amount of voltage change is not serious and can be tolerated on the equipment used.

By utilizing the remote adjustment described, the primary relay may be located where it will be accessible only to persons authorized and competent to make further adjustments and repairs thereto if such should be necessary, thereby removing the possibility of damage to the relay by adjustments made by unskilled personnel.

I claim as my invention:

1. In combination, a regulator disposed for operation to govern an alternating current electric circuit, a primary relay having an operating winding sensitive to the voltage of the regulated circuit disposed for operation to control the operation of the regulator, a reactor connected in series circuit relation with the energizable winding, a potentiometer connected in parallel with the series connected winding and reactor, and a capacitor disposed to be selectively connected in parallel with said winding or said reactor to adjust the energization of said winding.

2. In combination, a regulator disposed for operation to govern an alternating current electric circuit, a primary relay having an operating winding sensitive to the voltage of the regulated circuit disposed for operation to control the operation of the regulator, a reactor connected in series circuit relation with the energizable winding and having a fixed terminal therebetween, a potentiometer connected in parallel circuit relation with the series connected operating winding and reactor, the potentiometer having a slidable contact member, and a capacitor connected between the fixed terminal and the slidable contact member disposed to be selectively connected by the slidable contact member in parallel with the operating winding or the reactor to adjust the energization of the operating winding.

3. In a regulator for governing an alternating current electric circuit, a primary relay responsive to variations in a regulated quantity for controlling said regulator, an energizing winding for the relay, means for impressing a voltage on said winding that is proportional to the quantity to be regulated, a control circuit connected between said impressing means and said winding for controlling the energization and positioning of the primary relay, the control circuit including a reactor connected in series circuit relation with said winding and a potentiometer connected in parallel with the series connected winding and reactor, and a capacitor disposed to be selectively connected in parallel with said winding or said reactor to adjust the energization of said winding.

4. In a regulating system for an alternating current voltage which is to be maintained at different magnitudes for différent operating conditions, in combination, apparatus for controlling the magnitude of the alternating current voltage, means having a winding disposed to be energized for effecting movement thereof to different positions for controlling the operation of the apparatus, means connected to provide a control voltage which is proportional to the alternating current voltage, a control circuit connected between the control voltage means and the winding of the control means for the apparatus for controlling the energization and positioning of the control means, the control circuit including a reactor connected in series circuit relation with the winding and a potentiometer connected in parallel with the series connected winding and reactor, and a capacitor disposed to be selectively connected in parallel with the winding or the reactor to adjust the energization of the winding.

5. In a regulator for governing an alternating current electric circuit, a primary relay responsive to variations in a regulated quantity for controlling said regulator, an energizing winding for the relay, means including a tapped transformer for impressing a voltage on said winding that is proportional to the quantity to be regulated, the taps of the transformer being adjustable to impress predetermined increments of voltage on said winding, a control circuit connected between said impressing means and said winding for controlling the energization and positioning of the primary relay, the control circuit including a reactor connected in series circuit relation with said winding and a potentiometer connected in parallel with the series connected winding and reactor, and a capacitor disposed to be selectively connected in parallel with said winding or said reactor to adjust the energization of said winding an amount within the range of one of said predetermined increments of voltage of the tapped transformer.

LESTER G. TUBBS.

No references cited.